TUNNEL DIODE CIRCUIT FOR CONVERTING FROM RETURN TO ZERO TO NON-RETURN TO ZERO OPERATION

Filed Jan. 22, 1965

INVENTOR
THOMAS M. LO CASALE

BY G. Donald Weber Jr.

ATTORNEY

United States Patent Office 3,325,655
Patented June 13, 1967

3,325,655

TUNNEL DIODE CIRCUIT FOR CONVERTING FROM RETURN TO ZERO TO NON-RETURN TO ZERO OPERATION

Thomas M. Lo Casale, Warminster, Pa., assignor to Sperry Rand Corporation, New York, N.Y., a corporation of Delaware Filed Jan. 22, 1965, Ser. No. 427,426
6 Claims. (Cl. 307—88.5)

Figure 1:
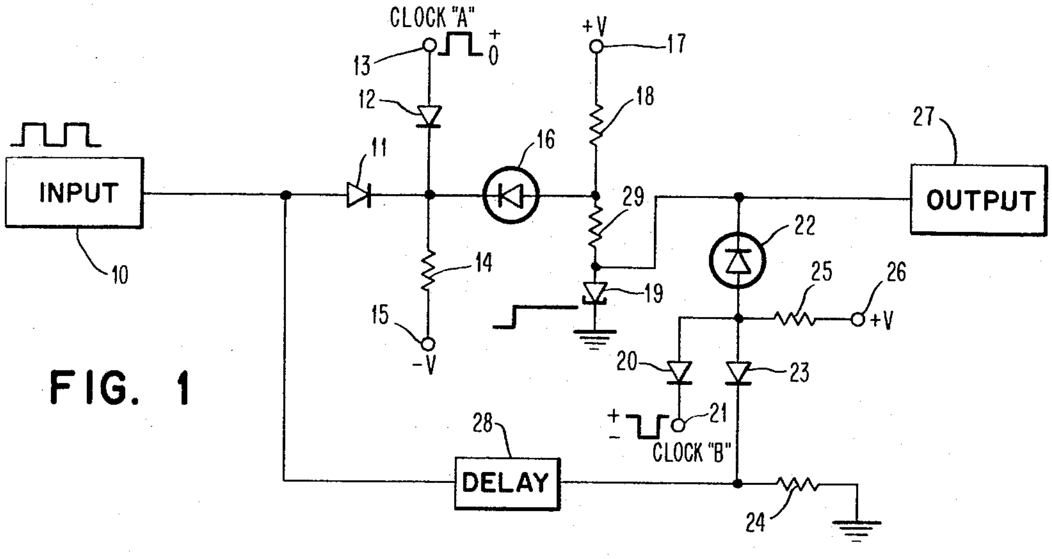

This invention relates to a circuit for converting one mode of operation to a different mode of operation. More particularly, the modes of operation are return-to-zero and non-return-to-zero, respectively, and the circuit utilizes enhanced tunnel diodes techniques.

There are a great number of tunnel diode circuits which have been disclosed and which have become known in the art. The vast majority of these tunnel diode circuits use the so called return to zero (RZ) mode of operation. That is, an input to the circuit will cause the tunnel diode to switch from one stable operating state to the other stable operating state. Likewise, a regularly recurring clock pulse is applied to the circuit to switch the tunnel diode back to the original stable operating state. Thus, the output of the circuit is detected in accordance with the stable operating state of the tunnel diode with regard to a standard reference which reference is the original operating state. Thus, even if the input signal to the tunnel diode circuit is a "level-type" signal, the output signal provided by the circuit is a "pulse type" signal. In many applications, it is desirable to interface the typical tunnel diode circuitry with additional circuitry. The additional circuitry may require a level-type signal, or may require a slightly slower speed signal than is supplied by the tunnel diode circuit in order to operate properly.

The instant invention discloses such an interface circuit. It is assumed that the input signal applied to the instant circuit is a pulse type signal supplied by a typical RZ tunnel diode circuit. The instant circuit utilizes standard ETD techniques as disclosed for example in United States Patent No. 3,244,903. Thus, an input signal is applied to the circuit to selectively interrupt forward current flow through a storage or enhancement diode. The interruption of forward current and, therefore, charge storage in the storage diode prevents the passage of reverse current therethrough in response to a properly poled clock pulse which reverse current (when present) is designed to switch the operating state of the tunnel diode. However, the improvements which permit the conversion of return-to-zero to non-return-to zero operation utilize a delay element which is also coupled to the input. Between the tunnel diode and the delay element there is connected a current switching network which includes a rectifier diode and a storage diode connected back-to-back. Through the delay element, the input signal which selectively interrupts forward current flow and charge storage in the first mentioned storage diode also selectively interrupts current and charge storage in the additional storage diode. Thus, when a reset signal is applied, a reverse current flows through the additional storage diode when charge was previously stored therein. The reverse current causes the tunnel diode to be reset. Since the charge storage operation in each of the storage diodes requires a different state of the input signal, it is clear that the setting and resetting of the tunnel diode can be accomplished only through a change in the state of the input signal.

Thus, it becomes obvious that one object of this invention is to provide a return-to-zero to non-return-to-zero operating mode converter.

Another object of this invention is to provide a circuit which is useful for interfacing between high and low speed operating circuits.

Another object of this invention is to provide an inte facing circuit between high speed tunnel diode circuil and slower speed circuits.

Figure 2:
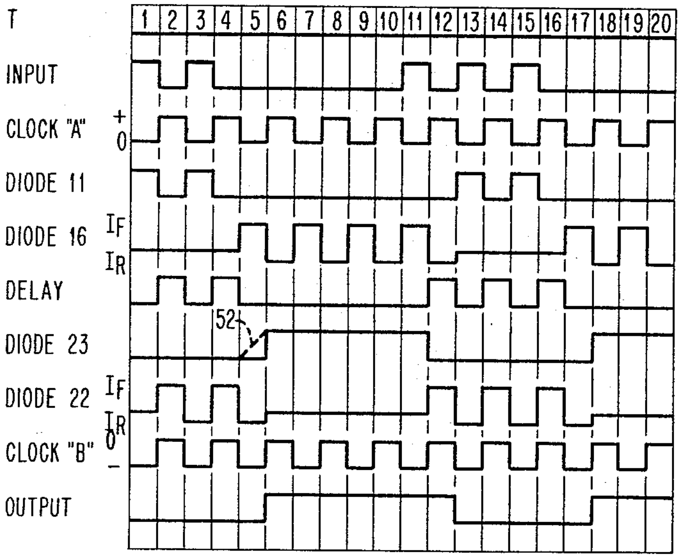

These and other objects and advantages of this inver tion will become more readily apparent when the follov ing specification is read in conjunction with the accom panying drawings in which:

FIGURE 1 is a schematic diagram of the preferre embodiment of this invention; and FIGURE 2 is a timing diagram, in graphical forr showing the operation of this circuit.

Referring now to FIGURE 1, there is shown a sche matic diagram of the instant circuit. The input 10 i shown in block form and may be any typical high spee input circuit or similar device. This input device may, i fact, be a tunnel diode circuit such as the one describe in the United States Patent No. 3,244,903, noted supr Connected to the input device 10 is the anode of diode 11 Typically, diode 11 may be a germanium diode having relatively low forward voltage drop. The cathode o diode 11 is connected to one terminal of resistor 14. An other terminal of resistor 14 is connected to terminal 1 which represents any source which supplies a substantial ly constant negative potential. The combination of resisto 14 and source 15 provides a substantially constant cur rent sink.

Also connected to the cathode of diode 11 is the cathod of diode 12. Typically, diode 12 may be a high spee rectifier diode having the anode thereof connected t terminal 13 which represents a suitable source capable o supplying regularly recurring clock signals. The magnitud of the signal or pulse supplied by source 13 is dependen partially upon the forward voltage drop of diode 12 an upon the current requirements of the output circuit an the remainder of the instant circuit. In this embodiment it is preferable for diode 12 to be a silicon diode having relatively high forward voltage drop thereacross.

The cathode of storage diode 16 is also connected t the cathode of diode 11. Diode 16 may be any typical stor age diode which exhibits the characteristic of storin charge in the lattice structure thereof in response to forward current therethrough. Typically, storage diode 1 should be a germanium diode having a relatively low for ward voltage drop thereacross. That is, diodes 11 and 1 should have similar forward voltage drop characteristics Connected to the anode of storage diode 16 is one ter minal of level shifting resistor 29. Another terminal o resistor 29 is connected to the anode of tunnel diode 19 The level shifting resistor 29 assures that diode 16 wil conduct (to the exclusion of diode 11) when the inpu and output signals are similar. That is, the potential at th anode of storage diode 16 is somewhat elevated witl respect to the potential at the anode of tunnel diode 19 The type of tunnel diode 19 is dependent upon the magni tude or signal range which is desirable. Tunnel diode 1 may be any typical tunnel diode which has separate region of positive resistance separated by a region of negativ resistance in the voltage-current characteristic thereof The cathode of tunnel diode 19 may be returned to an typical reference potential, for example ground.

Connected to the anode of the storage diode 16 an the first terminal of resistor 29 is one terminal of resis tor 18. Another terminal of resistor 18 is connected t terminal 17 which represents any typical substantiall constant, positive potential source. Source 17 and re sistor 18 combine to form a substantially constant cur rent source which is designed to bias the tunnel diod 19 for bistable operation. It should be noted that leve shifting resistor 29 is not essential and may be eliminated However, with the elimination of resistor 29, diode 11 should be a silicon or similar type diode having a high forward voltage drop thereacross than storage diode 16.

Also connected to the anode of tunnel diode 19, is output device 27 and the cathode of storage diode 22. Output device 27 may be any type of circuit or device which utilizes the output signal produced by the instant circuit. Storage diode 22 may be similar to storage diode 16. The anode of storage 22 is connected to one terminal of resistor 25. Another terminal of resistor 25 is connected to terminal 26 which represents any typical, substantially constant, potential source. In fact, sources 17 and 26 may be the same source. Since resistor 25 and source 26 provide a substantially constant current source, the value of resistor 25 may be varied along with the value of the potential source 26 to provide a desired current value. Connected to the anode of storage diode 22 is the anode of rectifier diode 20. Diode 20, which may be similar to diode 12, has the cathode thereof connected to terminal 21. Terminal 21 is representative of any typical source capable of supplying a regularly recurring reset clock signal. The signal supplied by source 21 may be similar to the signal supplied by source 13 with the exception that source 21 normally provides a swing between a slightly positive potential and a negative voltage level. The potential supplied by source 21 need not be slightly positive if the forward voltage drop across diode 20 is sufficiently larger than the forward voltage drop across diodes 22 and 23. This may be accomplished by placing a plurality of diodes in series with source 21. Also connected to the anode of storage diode 22 is the anode of rectifier diode 23 which may be similar to input coupling diode 11. The cathode of diode 23 is connected to one terminal of resistor 24. Another terminal of resistor 24 may be connected to any suitable reference potential source such as ground. Resistor 24 provides the termination for delay element 28. Also connected between the anode of diode 11 (i.e., the input to the instant circuit) and the cathode of diode 23, is delay element 28. Delay element 28 may be any typical delay element such as transmission line, coaxial cable, or the like. Delay element 28 will typically have a delay equivalent to a one bit or one time period delay.

Referring now to FIG. 2, there is shown a timing diagram which is useful in describing the operation of the circuit shown in FIGURE 1. The input signals supplied are pulse type signals. These signals may be supplied by input source 10 which may be any suitable input source such as a tunnel diode circuit or the like. The clock A signal is a regularly recurring signal which varies between a base line potential, for example ground, and a relatively more positive potential, for example +3 volts. The clock A signal is supplied by source 13 and may be considered as being the set clock signal for tunnel diode 19. The clock B signal is a regularly recurring signal varying between a suitable reference potential which may be ground or slightly positive (as noted supra) and a negative potential, for example −3 volts. The clock B signal is supplied by source 21 and may be considered to be the reset clock for tunnel diode 19. The output signal is detected at output device 27. The delay signal is a signal produced at the output of delay element 28 and, in fact, is identical to the input signal with the exception that the delay signal is delayed one time period relative to the input signal. The signals diode 11 and diode 23 represent the passage of current through the respective diodes by a high level signal while a low level signal represents relative non-conductance of the diodes. Diodes 16 and 22 are storage diodes. Therefore, the associated signals represent forward current flow ($I_F$) through the diodes by high level signals, reverse current flow ($I_R$) by low level signals, and non-conduction by the intermediate level.

At time period T1, a high level input signal is applied to the anode of diode 11 as well as to the delay element 28. Diode 11 is forward biased whereby current flows therethrough to the current sink comprising resistor 14 and source 15. This operation also reverse biases storage diode 16 (since tunnel diode 19 is in the low voltage state) whereby there is no forward current therethrough. Because tunnel diode 19 is assumed to have been set to the low voltage operating condition, the output signal is a low level signal. Since the clock B signal is a low level (negative) signal, current flow exists in diode 20. The current in diode 20 is provided by the current source comprising resistor 25 and source 26. Little or no forward current flows in storage diode 22 because diode 22 is reverse biased by the potentials applied at the electrodes thereof. Similarly, diode 23 is reverse biased when a low level clock B signal is applied to the cathode of diode 20.

At time period T2, the input signal supplied by source 10, becomes a low level signal. Simultaneously, the signal supplied by clock A at source 13 becomes a high level signal. Thus, both rectifier diode 11 and storage diode 16 are reverse biased and no current flows therethrough. The delay element 28 produces a high level signal at this time, which high level signal is actually the input signal supplied at time period T1 which has been delayed for one clock period. The high level signal provided by delay element 28 is supplied to the cathode of diode 23 and reverse biases this diode. Since clock B has assumed the relatively high level whereby diode 20 is reverse biased, forward current flows in storage diode 22 from source 26. The forward current flow in storage diode 22 causes the storage of charge therein, as is known in the art.

At time period T3, the input supplied by source 10 becomes a high level signal again while the clock A signal becomes a relatively low level signal. This situation produces current flow in diode 11 but non-conduction in diode 16. The output from delay element 28 is the low level signal produced by input source 10 during time period T2. Therefore, diode 23 is considered as being reverse biased (or at least zero biased) and having no forward current flow therethrough. This condition exists inasmuch as the clock B signal has switched to its low level condition and is drawing reverse current through diode 22. The reverse current through diode 22 is, of course, obtained from the tunnel diode circuitry whereby the tunnel diode remains in the low voltage operating condition and no change is effected at output 27.

At time period T4 the input signal goes low and the operation of the circuit is identical to the operation described at time period T2.

At time period T5, a low level input signal is applied. At this time, the clock A signal is also a low level signal. This condition is sufficient to effectively zero bias diode 11 such that there is no conduction therein. However, storage diode 16 is now forward biased (because of the potential level shift produced by resistor 29) whereby forward current exists therein. Furthermore, the output from delay element 28 is a low level signal which represents the low level input signal of time period T4. The clock B signal is a low level signal at this time and causes reverse current flow through storage diode 22. As the reverse current through diode 22 tends to "clean-up" the charge stored therein, this diode tends to exhibit higher and higher impedance such that some current will tend to flow through rectifier diode 23. This is schematically represented by the sloping dashed line 52 at diode 23 during time period T5. Of course, if desired, this transistion may be minimized or eliminated by suitable design of the circuit. At time period T6, the input signal is a low level signal and the clock A signal is a high level signal. This causes diode 11 to be zero biased and non-conductive but causes a reverse current flow through diode 16 to tunnel diode 19. This reverse current flow, as is known in ETD circuitry and described in the copending Brian E. Sear application noted supra, is sufficient to switch tunnel diode 19 to the high voltage operating condition. This operation causes the output signal to switch to the high level at time period T6.

At time periods T7 and T9, the input signals remain low. In addition, the clock A signals are low. These conditions permit forward current flow in storage diode 16 while rendering diode 11 non-conductive. Moreover, delay element 28 continues to provide low level output signals as would be expected. Since the delay element continues to produce a low level signal, diode 23 remains forward biased and conducts forward current therethrough such that no forward current flows through storage diode 22. Consequently, with the application of the clock B signals, there is no reverse current flow through storage diode 22. At most, the current flow through rectifier diode 23 may be reduced somewhat to this clock B signal. However, this phenomenon is not critical and need not be discussed in detail. That is, so long as no forward current flows in storage diode 22 to thereby permit a reverse current flow therethrough in response to a low level clock B signal, tunnel diode 19 will not be reset thereby.

At time periods 8 and 10, the input signal is a low level signal while the clock A is a high level signal. This condition continues to render diode 11 non-conductive but creates a reverse current flow through storage diode 16. However, inasmuch as tunnel diode 19 is already in the high voltage operating condition, these conditions at the input and clock A signals will effect no change in the output signal. Of course, certain transient effects may be observed, but for illustrative purposes, an idealized circuit is assumed and these transient effects are not shown and described.

At time period T11, the input signal again switches to the high level. The clock A signal at this time is a low level signal. However, the potential at the anode of storage diode 16 is high inasmuch as tunnel diode 19 is in the high voltage state. Therefore, forward current flow exists in diode 16 and no forward current flow exists in diode 11. Delay element 28 continues to produce a low level output signal as expected. The remainder of the circuit continues as in the previous operating periods.

At time period T12, the input signal goes low again in coincidence with a high level clock A signal. This combination of signals renders diode 11 non-conductive and produces reverse current through storage diode 16. Delay 28 now produces the high level signal representative of the input signal at T11. This high level signal reverse biases diode 23 so that forward current does not flow therethrough. However, forward current does flow through storage diode 22 thereby storing charge therein. The clock B signal is a high level signal having no effect and the output signal remains at the high level.

At time period T13, the input signal switches high again in coincidence with a low level clock A signal. Thus, diode 11 has forward current flow therethrough while diode 16 remains non-conductive. Delay element 28 reproduces the low level signal applied at the input during time period T12. The clock B signal produced by source 21 is a low level signal thereby causing current flow through diode 20 and reverse current through storage diode 22. This reverse current, as noted supra, is drawn from the tunnel diode 19 circuit and is of sufficient magnitude to cause tunnel diode 19 to be reset to the low voltage operating condition. Thus, the output signal switches to the low level at time period T13.

At time period T14, the input signal becomes a low level signal and the circuit operates as it did during time period T2. Similarly, at time period T15 the input signal again switches high and the circuit operates as it did during time period T3.

At time period T17, the input switches low, as it did at time period T5 and the circuit operation at time period T17 is identical to the circuit operation described at that time. The input signal remains a low level signal from time period T18 through time period T20 and the operation of the circuit is identical to that described from time period T6 through time period T8.

Thus, it is seen that the input signal which may be supplied by a typical circuit such as a tunnel diode circ represents a return-to-zero (RZ) mode of operation. T output signal is a level signal and represents a non-retur to-zero (NRZ) mode of operation. In addition, this c cuit is designed to perform the NOR logic function, i no output when there is an input and vice versa. ( course, by suitable modification of the circuit, instead producing the "inverting" operation, the circuit may pr duce a direct output in addition to converting RZ to NR signals.

The foregoing description is utilized to teach a circu for converting one mode of signal information to anoth mode of signal operation. The description and the drav ing of the circuit are meant to teach a preferred embod ment thereof. Through suitable modifications which ma be made by those skilled in the art, the embodiment de scribed may be altered without altering the inventiv principles therein. Any such modifications are meant t be included within the scope of the invention.

The embodiments of the invention in which an exclu sive property or privilege is claimed are defined as fo lows:

1. In combination, input means, first rectifier diod means connected to said input means, bias means, firs storage diode means connected between said bias mean and said first rectifier diode means, first clock signa source means connected to said first rectifier diode mean and said first storage diode means, tunnel diode mean connected to said bias means, second clock signal sourc means, second rectifier diode means connected to sai second clock signal source means, delay means connecte between said input means and said second rectifier diod means, second storage diode means connected betwee said second clock signal source means and said tunne diode means, and output means connected to said tunne diode means.

2. In combination, input means for supplying periodi signals, first rectifier diode means connected to said inpu means and conducting forward current therethrough ir the presence of a signal supplied by said input means, firs bias means, first storage diode means connected to said bias means and said first rectifier diode means, said storage diode means conducting forward current therethrough and storing charge therein in the absence of forward current in said first rectifier diode, first clock signal source means connected to said first rectifier diode means and said first storage diode means, said first clock signal source providing signals which reverse bias said first rectifier diode and which produce reverse current through said first storage diode only subsequent to forward current conduction therethrough, tunnel diode means connected to said bias means and biased for bistable operation, said tunnel diode being switched from one stable operating state to the other in response to reverse current through said first storage diode, second clock signal source means, second bias means, second rectifier diode means connected to said second clock signal source means and said second bias means, said second rectifier diode means conducting forward current therethrough except when reverse biased, delay means connected between said input means and said second rectifier diode means such that an input signal is supplied to said second rectifier diode to reverse bias same a predetermined time period after being supplied to said first rectifier diode, second storage diode means connected between said second clock signal source means and said tunnel diode means, said second storage diode means conducting forward current therethrough and storing charge therein in the absence of forward current in said second rectifier diode, said second clock signal source providing signals, which produce reverse current in said second storage diode only subsequent to forward current conduction therethrough, said reverse current through said second storage diode being supplied by said tunnel diode means whereby said tunnel diode is switched from said other stable operating state said one stable operating state, and output means con-:cted to said tunnel diode means for detecting an out-ıt produced thereby.

3. In combination, input means, tunnel diode means :hibiting first and second stable states, first current ,itching means including a first source of regularly re-ırring pulses connected between said input means and :id tunnel diode means, said first current switching .eans selectively supplying current to said tunnel diode .eans for switching said tunnel diode means from said :rst stable state to said second stable state, output means, :cond current switching means including a second source f regularly recurring pulses connected between said tun-el diode means and said output means, said first and :cond sources of regularly recurring pulses providing ulses which are in phase, said second current switching ıeans selectively supplying current to said tunnel diode ıeans for switching said tunnel diode means from said :cond stable state to said first stable state, and delay ıeans connected between said input means and said sec-ınd current switching means for controlling the last amed means as a function of the operation of said input ıeans.

4. In combination, input means for selectively applying ıput signals, tunnel diode means exhibiting first and econd stable states, first current switching means con-ıected between said input means and said tunnel diode neans, said first current switching means selectively sup-ılying a current signal to said tunnel diode means for ;witching said tunnel diode means from said first stable state to said second stable state only in the absence of an input signal, output means including connecting means connecting said tunnel diode thereto, second current switching means including storage diode means having its cathode connected to said connecting means connected between said tunnel diode means and said output means, said second current switching means selectively supplying a current signal to said tunnel diode means for switching said tunnel diode means from said second stable state to said first stable state only in the presence of an input signal.

5. The combination recited in claim 4 including delay means connected between said input means and said second current switching means, said delay means applying signals at said second current switching means subsequent to the application thereof by said input means.

6. The combination recited in claim 4 wherein said first current switching means includes a clock pulse source, a rectifier diode, and a storage diode, said clock sources providing said current signals for said tunnel diode via said storage diodes.

References Cited

UNITED STATES PATENTS

| | | | |
|---|---|---|---|
| 3,181,006 | 4/1965 | Melhus | 307—88.5 |
| 3,225,220 | 12/1965 | Cubert | 307—88.5 |

ARTHUR GAUSS, *Primary Examiner.*

J. S. HEYMAN, *Assistant Examiner.*